Sept. 12, 1933.  N. L. CAUSAN  1,926,968
HIGHFLIGHT AEROPLANE
Filed April 18, 1929  6 Sheets-Sheet 1
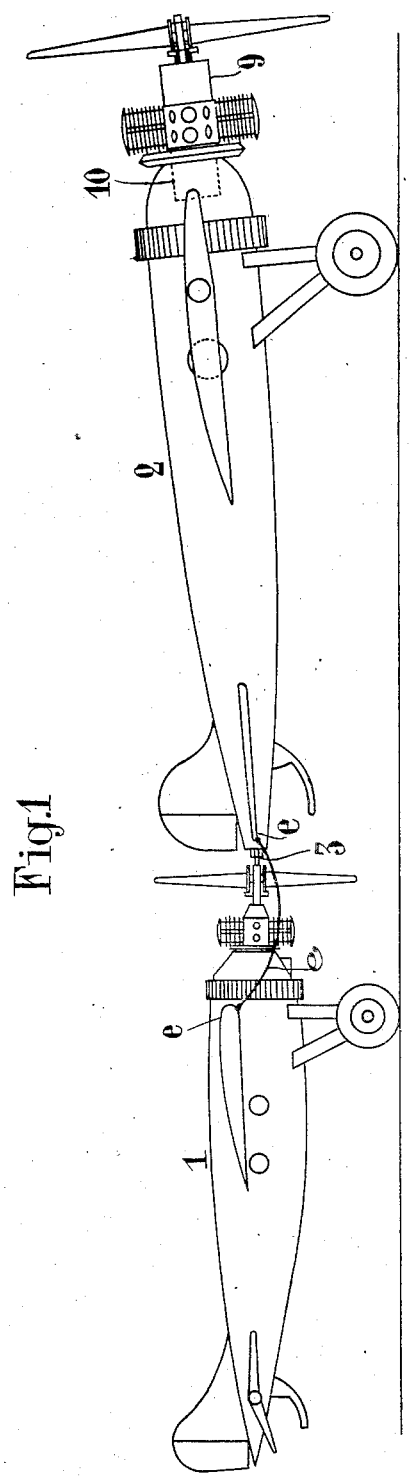
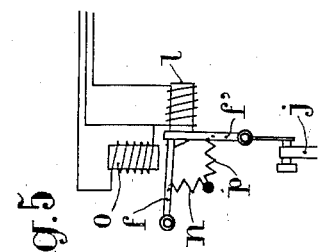
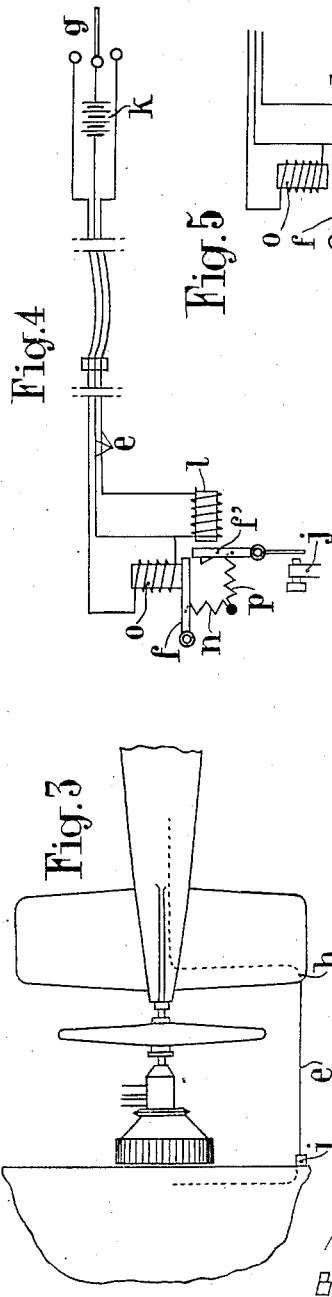
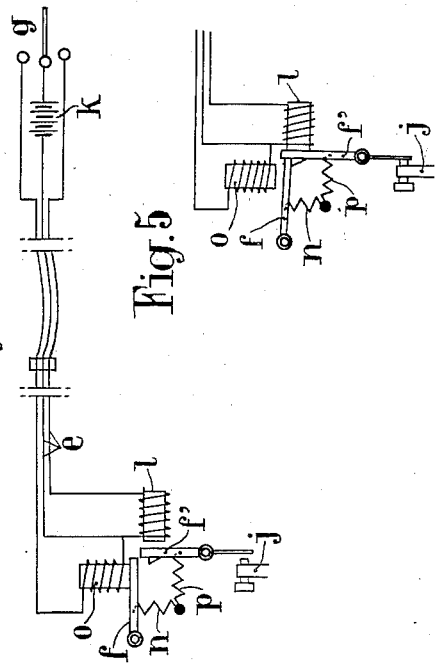
INVENTOR
N. L. CAUSAN
BY
ATTORNEY Sept. 12, 1933.  N. L. CAUSAN  1,926,968
HIGHFLIGHT AEROPLANE
Filed April 18, 1929    6 Sheets-Sheet 3
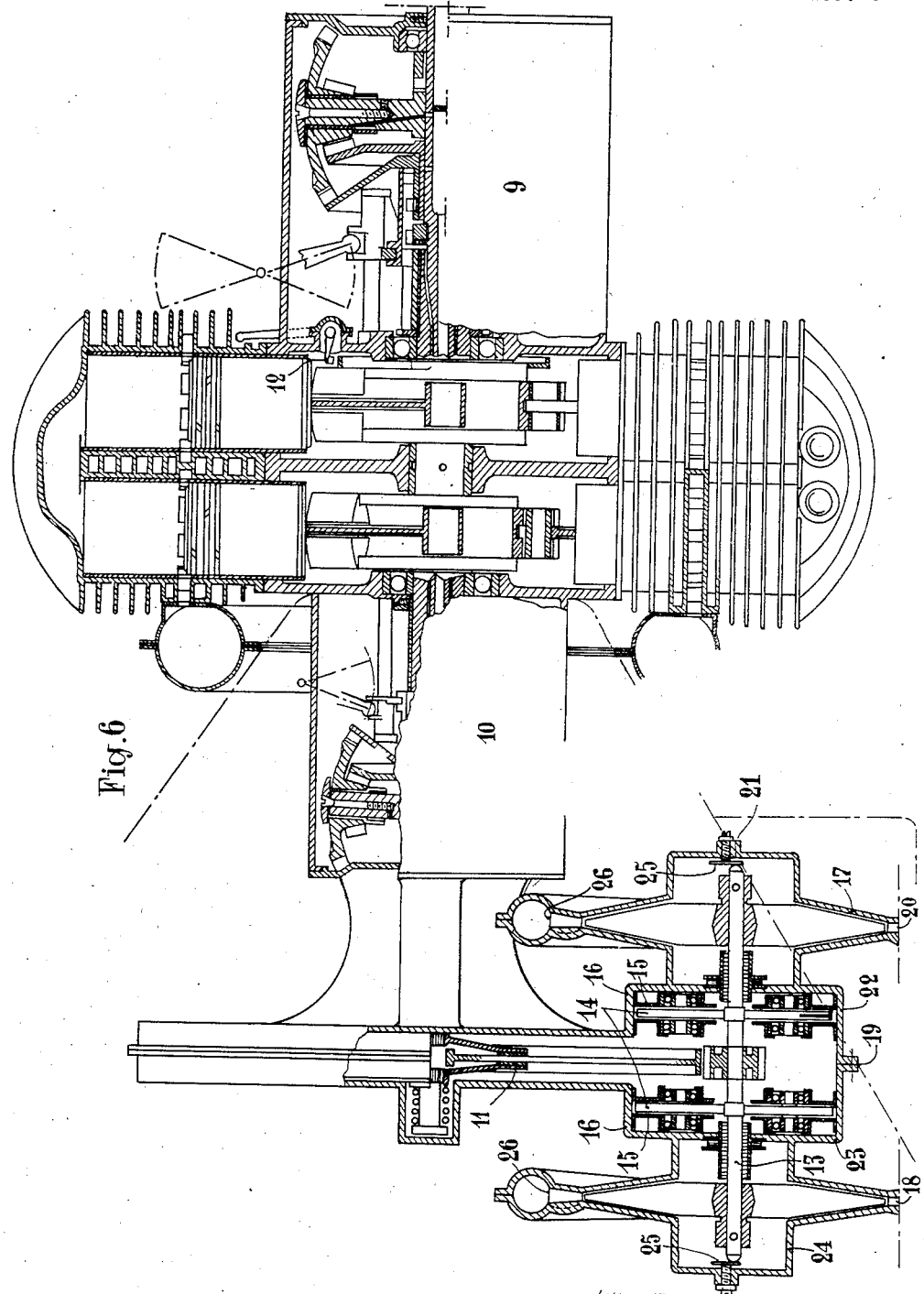

Sept. 12, 1933.  N. L. CAUSAN  1,926,968
HIGHFLIGHT AEROPLANE
Filed April 18, 1929  6 Sheets-Sheet 4
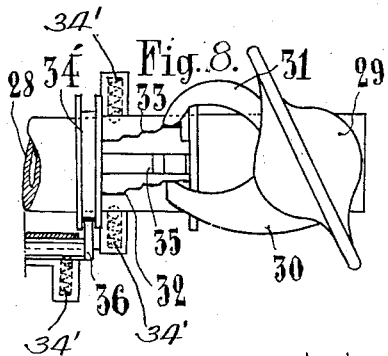
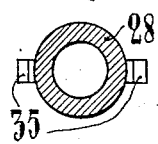
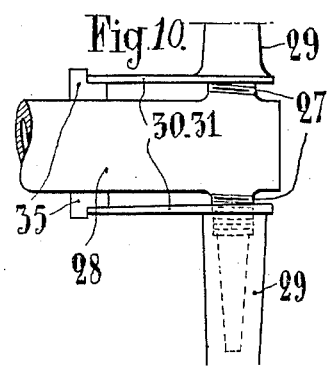
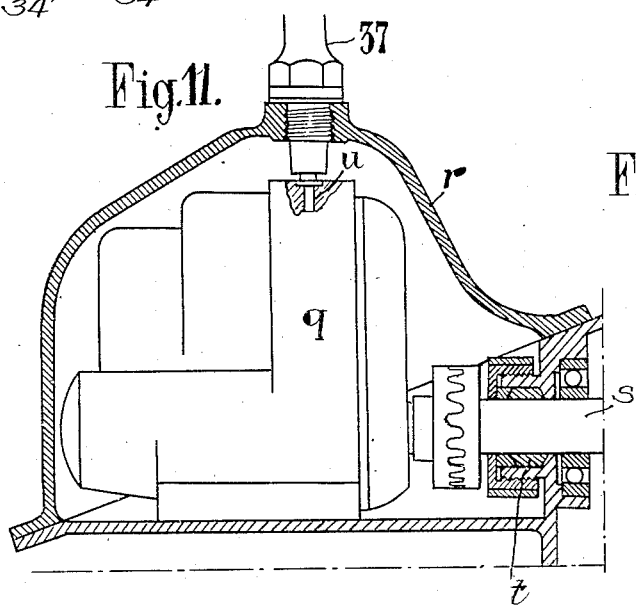
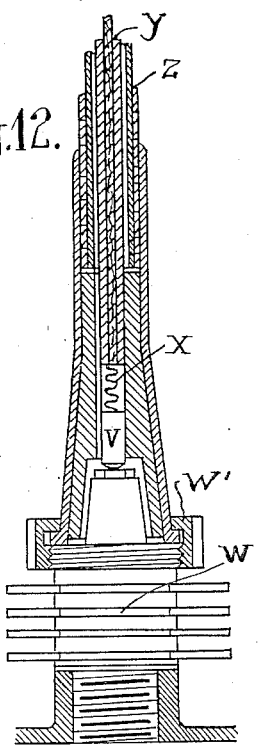
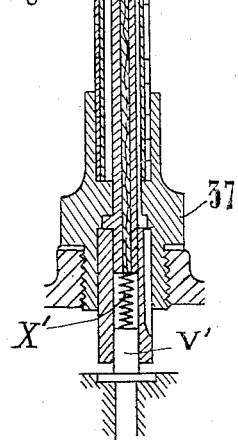
INVENTOR:
Nemorin Laurent Causan
BY
ATTORNEY Sept. 12, 1933.　　　N. L. CAUSAN　　　1,926,968
HIGHFLIGHT AEROPLANE
Filed April 18, 1929　　6 Sheets-Sheet 5

INVENTOR
N. L. CAUSAN
BY
ATTORNEY

Sept. 12, 1933.  N. L. CAUSAN  1,926,968
HIGHFLIGHT AEROPLANE
Filed April 18, 1929   6 Sheets-Sheet 6
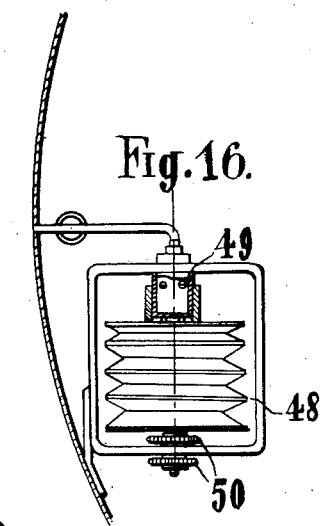
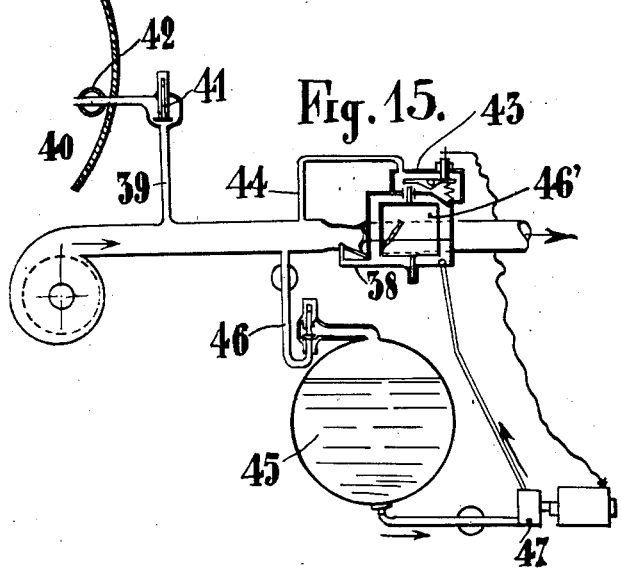
INVENTOR:
Nemorin Laurent Causan
BY
ATTORNEY Patented Sept. 12, 1933

1,926,968

UNITED STATES PATENT OFFICE 1,926,968

HIGHFLIGHT AEROPLANE

Nemorin Laurent Causan, Suresnes, France

Application April 18, 1929, Serial No. 356,236, and in France April 30, 1928

5 Claims. (Cl. 244—1)

This invention contemplates improvements in or relating to highflight airplanes, with a view to increase the speed and range of flight thereof.

In the appended drawings there is shown by way of example a preferred embodiment of this invention.

Fig. 1 shows, coupled together, the main flying machine and its towing machine.

Fig. 3 represents the electric connections leading from one machine to the other.

Figs. 4 and 5 are diagrammatic views showing the details of said connections.

Fig. 6 shows on a larger scale the driving unit of the towing machine.

Figs. 8, 9 and 10 show details of one of the variable-pitch propellers.

Fig. 11 is a vertical sectional view showing a magneto installed within an air-tight casing, and the mounting on the casing of one end of the spark-plug.

Figs. 12 and 13 are sectional views of the opposite ends of the spark-plug.

Fig. 15 is a diagram of the piping.

Fig. 16 shows a manometer by which the pressure is automatically kept constant in the air-tight cabin for the pilot and passengers.

Reference will first be had to Fig. 1. The main machine 1 is designed exclusively for flight at the desired height. The towing is effected by a towing machine 2 which separates from the main machine when the working height and speed are attained. This enables the main machine 1 to be simplified, and it will comprise no change-speed mechanism. Safety, range of flight and, above all, speed are increased. The towing machine 2 may be equipped with a very high power engine so as to enable rapid climbing.

The chief result will be a considerable reduction in the weight of the main machine, inasmuch as a small power is sufficient in highflight conditions to sustain the flight; the consumption and weight of its engine are thereby reduced to a minimum.

Figure 2:
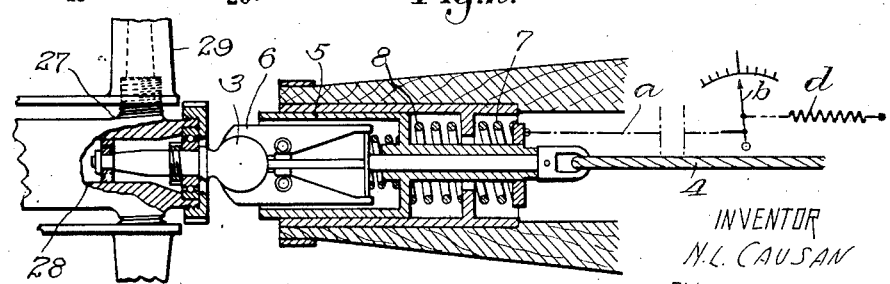
Fig. 2 shows in detail the ball-and-socket joint by which both machines are coupled.

Both machines 1 and 2 are coupled together by means of a ball-and-socket joint 3 which, where a central propeller located in front of the machine 1 is used, is mounted at the end of the propeller shaft and is rotatable with respect thereto (see Fig. 2). At the desired moment, the pilot of the towing machine 2 releases the ball-and-socket coupling device 3 by pulling rope 4. The housing 5 for claws 6 is not wholly rigid with the rear part of the towing machine but is adapted to slide a small distance and is maintained longitudinally by two springs 7 and 8 under the tractive or pushing efforts, it moves slightly rearward or forward with relation to the machine 2; these efforts being transmitted by the cable $a$ to the pointer $b$ returned by a spring $d$ (Fig. 2). The pilot of the towing machine can thus take into account, by watching pointer $b$, the value of the tractive effort transmitted by the joint 3; but in order to preclude any mishap, he will release the ball-and-socket joint only when such tractive effort is decidedly positive. To release the joint 3, the pilot of the towing machine 2 pulls the rope 4. The claws 6 are fulcrumed in the housing 5, and the tension of the rope 4 swings the claws 6 against the resistance of a spring (not shown), and the claws 6 release the ball 3. This frees the main machine 1 from its towing machine 2.

The wings of the towing machine 2 are each for itself of variable incidence constructions; they act both as depth rudders and stabilizers.

It is essential that the pilot of the front or towing machine 2 be able to cut out the ignition of the engine of the rear or trailing machine 1, particularly at the moment when he changes the speed of his own machine, or else in case of failure of the engine of the towing machine, so as to be able to uncouple the two machines without danger. Electrical connections between the two machines permit this operation; such connections being illustrated in Figs. 3, 4 and 5 as comprising a flexible wire $e$ comprising three branch conductors which connects the ignition switch for the engine of the rear machine with a sort of lever or armature $f$ arranged, for example, within reach of the rear pilot, and the commutator $g$ in reach of the front pilot.

The current flow from one machine to the other takes place at $h$ from one end of the fixed horizontal wing of the front machine to the front end of the wing of the rear machine, by means of the wire $e$ which is long enough to prevent interfering with the relative movements of the two machines. At the moment of uncoupling of said machines, the connection becomes detached at $i$ from the front wing of the rear machine.

To cut out the ignition, magnetically if necessary, the armature lever $f'$ must come in contact with the terminal $f$ connected to the primary of the magnets. The front pilot will switch the current from the current source $k$ into the magnet $l$, which will attract armature $f'$, thus cutting out the ignition. The armature $f$, influenced by the spring $n$, will keep armature $f'$ in the position shown in Fig. 5.

The ignition is restored by the front pilot switching the current into magnet $o$, whereupon armature $f$ will release armature $f'$ which, influenced by spring $p$, will re-establish the ignition. If ignition is secured by means of accumulators, armature $f$ will make or break the current; and if it is a question of uncoupling the two machines, the pilot of the rear one can, it will be understood, re-establish the ignition immediately he considers it advisable. Hence, at the will of the front pilot, the traction effort cannot become negative when the speed-changing operation is being carried out on the front machine.

The engine shown in Fig. 6 is a two-cycle engine of the radial type with twin cylinders. On the front side, it drives the propeller, through two change-speed change gears 9 and 10, and on the rear side it drives the compressors by means of a friction clutch so as to avoid gear teeth breakage in the case of an irregular working of the engine. The various speeds of these change-speed gears are employed by pairs and are so designed as to ensure the highest efficiency in the working of the machine. In the example shown there are provided three such speeds, the top speed being given by direct drive.

In order to facilitate speed changes, principally for the compressors, the pilot may operate a brake 12 whereby a quick reduction in the speed of the engine may be obtained.

Each change-speed gear is provided with a change-speed indicator which, according to a known principle, permits operation exactly at the desired time. These indicators are of known type and are not included in any of the appended claims, for which reason they are not illustrated nor described in detail.

According to a known arrangement, the rear crank case of the engine corresponding to the intake is gas-tight and fresh gas leakage between pistons and cylinders on the intake side is avoided.

To avoid the rapid wear resulting from the very high speed of turbo-compressors 13, the bearings for these devices consist each of three rollers 14 which are in turn carried upon ball bearings and the speed of which is reduced. Said three rollers are mounted in two jaws 15 which are centered in crank cases 16 and 22—23.

The joints 18, 19 and 20 are provided only for manufacturing purposes; the usual dismounting takes place at joint 21. Moreover, the air inlet and outlet for each compressor are located on the crank cases between the plane of joint 21 and the main axis of the compressors, so that the inspection or replacement of a group of rotors involves only the removal of crank cases 17, 22, 23, 24 but not that of the air piping. The abutments 25 allow of easy adjustment.

The diffusors consist of sheet metal plates 26 which are tailed-in on one side only to facilitate the erection.

In the example given, the compressors of both the main machine 1 and towing machine 2 have six stages of compression. On leaving each stage but the first one, the air is led into a radiator so as to avoid excessive temperatures and increase the efficiency of the compressor.

The radiators are diagrammatically shown in side-by-side relation around the fuselage. They may be arranged in any other relation.

Figure 7:
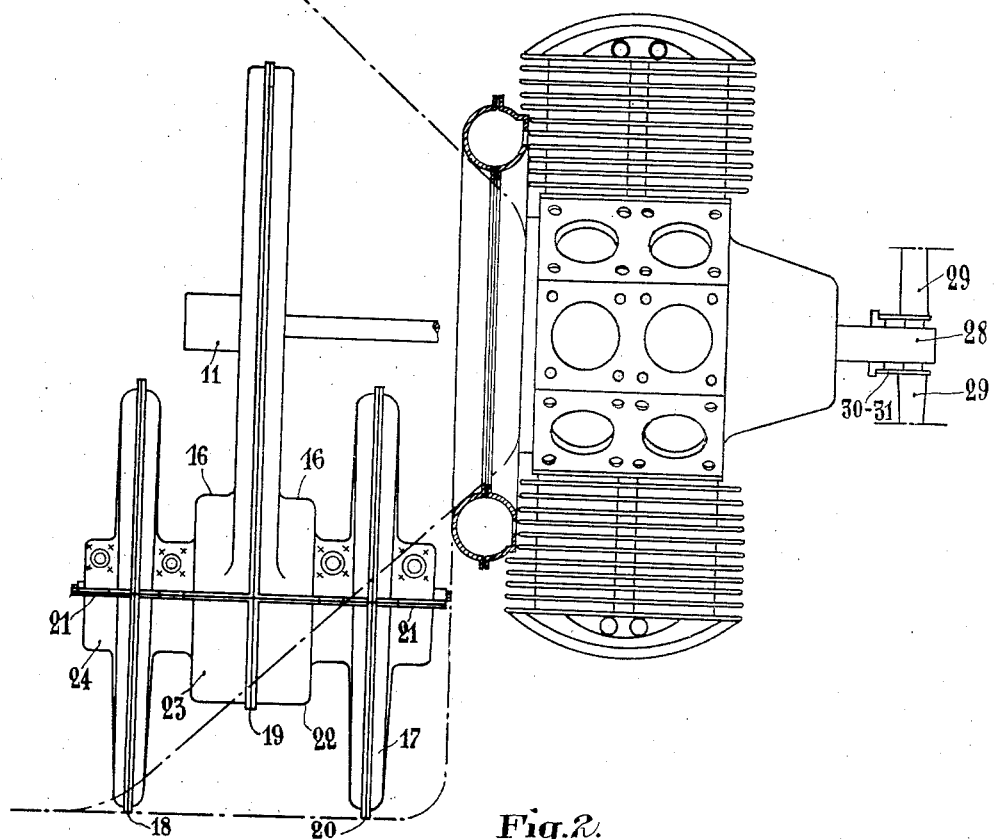
Fig. 7 shows on a larger scale the driving unit of the main machine.

In the example considered, the driving unit of the main machine 1 (Fig. 7) is constructed similarly to that of the tug machine 2 but is considerably less powered and has no change-speed devices.

For high flight irrespective of whether the engines are of two-cycle or four-cycle construction, it is not necessary that the combustion gases remaining in the cylinders after the expansion thereof should be exhausted, that is to say, the scavenging is not particularly useful in two-cycle engines. As to the main machine engine, which does not have to operate normally at low-altitude flight, the angle of scavenging may thus be reduced so as to avoid fresh gas losses.

Although no change-speed gear is necessary on the main machine 1, there may be provided two speeds for this machine, the top direct drive speed being intended for use when flying at high altitude, and the lower for flight at ground level, whereby the return flight may be effected without the aid of a towing machine in the case of a compulsory landing and which facilitates the usual landing.

For both the towing machine 2 and main machine 1 there may be used fixed pitch propellers, but a higher efficiency and easier driving will be secured by the use of variable pitch propellers. The adjustment of the engine speed will preferably be obtained by varying the pitch of the propeller, but it may be secured by more or less throttling the air supply to the compressors or by momentarily taking in the whole or part of the air between the first and second stages.

A towing machine may also be devised which comprises no speed-change device on the compressor side, the regulation of the compressors being obtained by the above described methods.

The variable pitch propeller shown in Figs. 8, 9 and 10 comprises primarily two or more arms 27 solid with hub 28 and upon which are screwed the blades 29 each of which carries two levers 30 and 31 swung by means of cams 32 and 33 which are rigidly connected to guide 34 and are capable of a sliding motion by the operation of a hand lever or through a servo-motor. The cams 32 and 33 are guided by means of lugs 35. The control member (in the form of a yoke 36) and the guide 34 are both provided with a ball-and-spring locking device 34' so that, on account of the play provided between guide 34 and yoke 36, no contact exists between these parts in normal operation. Therefore, no wear or binding can take place.

Fig. 9 is a cross sectional view of the propeller shaft taken adjacent to lugs 35. Parts 32, 33 and 34 are omitted in Fig. 10.

The cams are so shaped that they cannot be shifted longitudinally by levers 30 and 31 at any stop thereof.

To provide for ignition at all altitudes, the magneto or magnetos $q$ (Fig. 11) or, generally, the ignition system, will be enclosed in a small air-tight casing $r$ communicating with the air-tight cabin 40 of the pilot (Fig. 15) and capable of being isolated from the same by a valve situated within the interior of the cabin in reach of the pilot's hand. The joint or mounting of the controller $s$ for the magneto will be made as tight as possible by a stuffing-box $t$ (Fig. 11).

In normal working, the pressure within the casing $r$ will be equal to that prevailing in the cabin 40 and substantially to the pressure of the atmosphere near the ground.

For each spark-plug of the engine (see Figs. 12 and 13), the secondary current is connected on a member $u$ by a carbon or metal member $v$ which is pressed by a spring $x$ against the spark-plug lead $y$; said lead being enclosed by an airtight sheath $z$ joined at one end to the casing $r$ by the member 37 (Fig. 13), and at the other end to the body of the plug $w$ by the screw $w'$. The connection of the spark-plug lead with the central electrode of the spark-plug is obtained by a member $v'$ and a spring $x'$ similar to the parts $v$ and $x$. A slight play exists between the lead $y$ and its sheath $z$, so that the pressure of the air contained in casing $r$ is communicated to the central electrode of the spark-plug. Thus the entire ignition mechanism is kept at a pressure almost that of the atmosphere near the ground, and its operation at all altitudes is insured.

After voluntary or involuntary stoppage of the engine, the magneto casing being insulated from the cabin, and its pressure having fallen, being still at high altitude, the pilot can re-start the engine by putting back the magneto casing under load.

Figure 14:
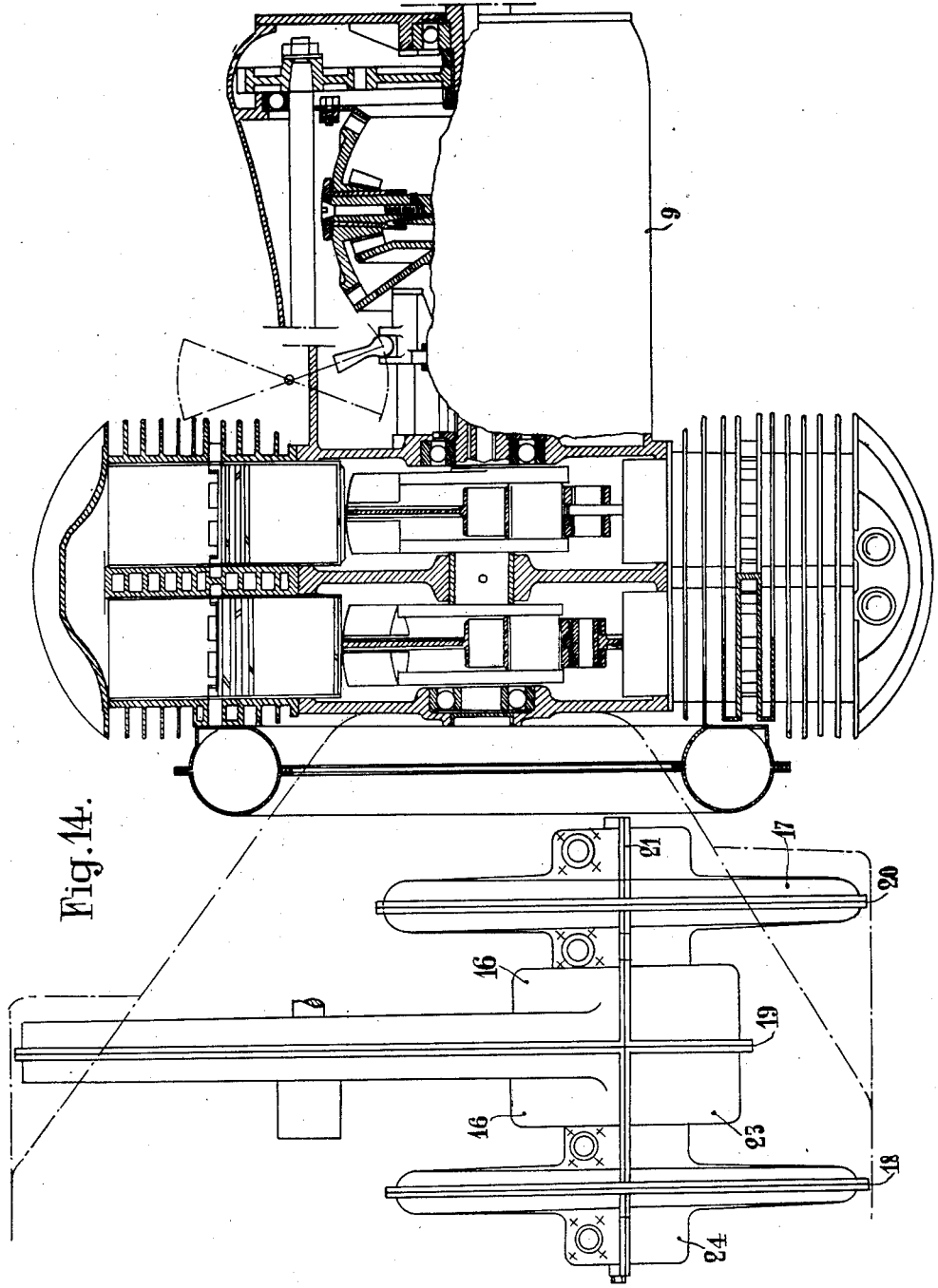
Fig. 14 shows a modification of the driving unit for the tug machine, where the compressors are driven by the propeller.

Both the speed of the airplane and that of the propeller which is supposed to have a substantially constant pitch are inversely proportional to the square root of the air density. Moreover, the pressure set up by the compressors is proportional to the square of their speed and to the density of the air. If the speed of the compressors remains proportional to that of the propeller, then the delivery pressure will be substantially constant. It follows that with both two-cycle and four-cycle engines, if the compressor were driven by the propeller as shown in Fig. 14, there might be obtained at any height a substantially suitable speed of the compressor. The regulation would only have to be corrected by the methods already mentioned.

Chiefly with big engines, the compressors may be arranged all around the propeller shaft, between the propeller and its change-speed gear, and driven by a spur wheel carried upon the propeller shaft.

The radiators have been omitted in the piping diagram shown in Fig. 15. The air supplied by the compressors passes through the carbureter 38 and is led into the engine, but some of it is delivered by a branch pipe 39 leading to the cabin 40; said pipe comprising a non-return valve 41 and a safety cock 42 operable by the pilot.

Should any intended or unintended stoppage of the engine occur while flying at high altitude, then the pilot would have to shut off immediately, by means of suitable cocks, all the apertures liable to cause leakage; for instance, the air inlet and outlet, the pipe leading to the magneto casing, etc. The constant level chamber 43 of the carbureter likewise communicates with the main pipe through pipe 44, together with the gasoline tank 45, through pipe 46. On account of the variations in pressure which may occur in the general air piping, the constant level chamber must be independent of the pressure in tank 45.

In the example given, the up and down movements of the float 46' of the carbureter cause the successive opening and closing of the circuit for the motor which drives the pump 47 feeding the constant level chamber. The feed of such pump is so adjusted as to be slightly greater than the maximum consumption.

The air pressure in the cabin must be kept constant notwithstanding the fresh air fed in from the main pipe. With this object in view, bellows 48 containing a certain amount of air or other gas collapses when the absolute pressure in the cabin is too high and allows a certain quantity of air to flow out through holes 49. A pair of screws 50 allow for the adjustment of the device.

By normal flight, there is maintained in the cabin a pressure which is slightly lower than that of the atmosphere at ground level and that in the main pipe before the carburetter. By the time the machine nears the ground, as the outer pressure is higher than the inner pressure, mishaps might follow. An automatic valve which opens inwards avoids such difference in pressure.

In the example given, the engine is of the two-cycle radial type, but engines of any two-cycle or four-cycle design equipped with any system of cooling may be used.

The driving unit may be enclosed in an airtight cabin which may be the same as that for the pilot and passengers, whereby ordinary engines may be used; however, this involves an increase in the weight of the machine.

In the example considered here, each of the compressors has six stages and six rotors. When there is a big air supply, the first rotors may be made to operate in parallel by pairs, there being provided for instance six stages and eight rotors the first four of which operate in parallel by pairs.

In order to have a simpler construction where the power is available in great excess, the change-speed gear between the engine and compressor may be done away with, the regulation of the operation of the compressor being obtained either by more or less throttling the air supply to the first stage or by causing momentarily the whole or part of the air to be taken in between the first and the second stages.

A machine may be devised the mechanical portion of which is constructed similarly to that of the towing machine, but which is arranged to operate alone. It may be provided with movable wings like those shown in Fig. 1 or constructed like ordinary machines with fixed wings and a depth rudder at the rear thereof.

Having now particularly described and ascertained the character of my said invention and in what manner the same is to be performed, I declare that what I claim is:—

1. The combination of a main flying machine designed exclusively for flight at high altitudes, and a towing machine located directly in advance of the main machine; a releasable ball-and-socket joint coupling said machines together; means for indicating the value of the tractive effort of the towing machine; and means enabling the pilot of the towing machine to release the joint at will.

2. An arrangement according to claim 1, in which the towing machine is provided with variable incidence wings enabling the pilot of the towing machine to adjust the speed and working altitude thereof.

3. An arrangement according to claim 1, in which means are provided enabling the towing machine to cut out the ignition momentarily on the main machine.

4. The combination of a main flying machine designed exclusively for flight at high altitudes, and a towing machine directly in advance of the main machine; a releasable joint coupling the two machines together; means enabling the pilot of the towing machine to release the joint; and means also enabling him to cut out the ignition momentarily on the main machine.

5. The combination set forth in claim 1, together with additional means for setting up a momentary resistance on the main machine to enable the uncoupling of the two machines should the engine on the towing machine fail.

NEMORIN LAURENT CAUSAN.